United States Patent [19]
Jenks

[11] Patent Number: 6,001,368
[45] Date of Patent: Dec. 14, 1999

[54] METHOD FOR INHIBITING OR REDUCING THE RISK OF MACULAR DEGENERATION

[75] Inventor: Belinda H. Jenks, St. Louis, Mo.

[73] Assignee: Protein Technologies International, Inc., St. Louis, Mo.

[21] Appl. No.: 09/146,443

[22] Filed: Sep. 3, 1998

[51] Int. Cl.$^6$ .......................................................... B32B 3/00
[52] U.S. Cl. ......................... 424/195.1; 424/427; 514/54; 514/912; 514/25; 514/27; 514/456; 514/457
[58] Field of Search ................................ 424/195.1, 427; 514/54, 912, 564, 567, 25, 27

[56] References Cited

U.S. PATENT DOCUMENTS

| | | |
|---|---|---|
| 4,157,984 | 6/1979 | Zilliken . |
| 4,218,489 | 8/1980 | Zilliken . |
| 4,232,122 | 11/1980 | Zilliken . |
| 4,264,509 | 4/1981 | Zilliken . |
| 4,366,082 | 12/1982 | Zilliken . |
| 4,366,248 | 12/1982 | Zilliken . |
| 5,141,746 | 8/1992 | Fleury et al. . |
| 5,506,211 | 4/1996 | Barnes et al. . |
| 5,603,936 | 2/1997 | Monte . |

OTHER PUBLICATIONS

*Isoflavone Contend in Commercial Soybean Foods*, Wang and Murphy, J. Agric. Food Chem., vol. 42, No. 8, pp. 1666–1673 (1994).
Abstract—*Effect of Soybean Isoflavones on Tumor Promoter—Induced $H_2O_2$ Production in Human Neutrophils and HL–60 Cells*, Wei and Barnes, Proceedings of the American Association for Cancer Research, vol. 34, p. 167 (Mar. 1993).
*The Flavanoids, Advances in Research Since 1980*, ed. J.B. Harbone, Chapman and Hall, Chapter 5, pp. 125–209 (1988).
*Isoflavone Composition of American and Japanese Soybeans in Iowa: Effects of Variety, Crop Year, and Location*, Wang and Murphy, J. Agric. Food Chem., vol. 42, pp. 1674–1677 (1994).
*Genistein, A Specific Inhibitor of Tyrosine–specific Protein Kinases*, Akiyama, Ishida, Nakagawa, Ogawara, Watanabe, Itoh, Shibuya, and Fukami, J. Biological Chem., vol. 262, No. 12, pp. 5592–5595 (Apr. 25, 1986).
*Soybeans: Chemistry and Technology*, pp. 187–188 (1978).
Control of Serum Lipids with Soy Protein, Erdman, *New England J. of Med.*, vol. 333, No. 5, pp. 313–315 (Aug. 3, 1995).
Soybean Utilization, *Chapter 2—Morphology and Composition*, pp. 64–66 (1987).
Meta–analysis of the Effects of Soy Protein Intake on Serum Lipids, Anderson, Johnstone, and Cook–Newell, *New England J. of Med.*, vol. 333, No. 5, pp. 276–282 (Aug. 3, 1995).
Soy Isoflavones Enhance Coronary Vascular Reactivity in Atherosclerotic Female Macaques, Honore, Williams, Anthony and Clarkson, *Fertil. Steril.*, vol. 67, No. 1, pp. 148–154 (Jan. 1997).

Soy Protein and Serum Lipids, Potter, Curr. *Opin. Lipidol.*, vol. 7, No. 4, pp. 260–264 (Aug. 1996).
Soybean Isoflavones Improve Cardiovascular Risk Factors Without Affecting the Reproductive System of Peripubertal Rhesus Monkeys, Anthony, Clarkson, Hughes, Morgan and Burke, *J. Nutr.*, vol. 126, No. 1, pp. 43–50 (Jan. 1996).
Biology of Atherosclerotic Placque Formation: Possible Role of Growth Factors in Lesion Development and the Potential Impact of Soy, Raines and Ross, *J. Nutr.*, vol. 125, Supp. 3, pp. 624s–630s (Mar. 1995).
Inhibition of Tyrosine Phosphorylation Prevents Delayed Neuronal Death Following Cerebral Ischemia, Kindy, *J. Cereb. Blood Flow Metab.*, vol. 13, No. 3, pp. 372–377 (May 1993).
Health Relevance of Soya Beans Due to their Isoflavonoid Content, Bohm and Franke, *Z. Lenensmittelwirtsch*, vol. 47, No. 12, pp. 55–57 (1996).
Soy in the Spotlight, Kuhn, *Food Process.*, vol. 57, No. 5, pp. 52–58 (1996).
Chemical Constitution and Biological Activity of Plants of the Clover Genus Trifolium L., Babaskin, Barabanov and Babaskina, *Farmatsiya Moscow*, vol. 38, No. 3, 78–82 (1989).
Modern Uses for an Ancient Bean: Soyfoods and Disease, Messina, *Chem. Ind.*, vol. 11, pp. 412–415 (1995).
A Review of the Clinical Effects of Phytoestrogens, Knight and Eden, *Obstetrics and Gynecology*, vol. 87, No. 5, pp. 897–904 (May 1996).
Phytoestrogens—A Short Review, Knight and Eden, *Maturitas*, vol. 22, No. 3, pp. 167–175 (Nov. 1995).
Symposia: Examining the Benefits of Dietary Phytoestrogens, *Inpharma*, Dec. 6, 1996.
*Estrogen Effect on Atherogenesis and Vascular Biology*, Williams (WFU), Federal Research in Process 1996, Sponsoring Org.: National Heart, Lung and Blood Inst.
Ostrogenic Effects of Plant Foods in Postmenopausal Women, Wilcox, Wahlqvist, Burger and Medley, *Br. Med. J.*, vol. 301, pp. 905–906 (1990).
Reproductive and General Metabolic Effects of Phytoestrogens in Mammals, Kaladas and Hughes, Reproductive Technology, vol. 3, pp. 81–89 (1989).
Naturally Occuring Oestrogens in Foods—a Review, Price and Fenwick, *Food Additives and Contaminants*, vol. 2, No. 2, pp. 73–106 (1985).
The Chemistry of Subterranean Clover. Part I. Isolation of Formononetin and Genistein, Bradbury and White, (1951).

(List continued on next page.)

*Primary Examiner*—James O. Wilson
*Attorney, Agent, or Firm*—Richard B. Taylor

[57] ABSTRACT

A method is provided for inhibiting or reducing the risk of macular degeneration with phytoestrogenic isoflavones. A further method is provided for inhibiting or reducing the risk of macular degeneration with a soy protein material containing phytoestrogenic isoflavones.

33 Claims, No Drawings

OTHER PUBLICATIONS

Determination of Lignans and Isoflavanoids in Human Female Plasma Following Dietary Supplementation, Wilcox, Wahlqvist and Griffiths, *J. of Endocrinology*, vol. 142(2), pp. 251–259 (1994).

Dietary Carbohydrates and Low Cholesterol Diets: Effects of Serum Lipids of Man, Hodges et al., *Am. J. Clin. Nutr.*, vol. 20, No. 2, pp. 196–208 (Feb. 1967).

Soy Protein and Serum Lipids, Potter, *Current Opinion in Lipidology*, vol. 7, pp. 260–264 (1996).

Quantitation of Phytoestrogens in Legumes by HPLC, Franke et al., *J. Agric. Food Chem.*, vol. 42, pp. 1905–1913 (1994).

Phytoestrogens: Epidemiology and a Possible Role in Cancer Protection, Adlercreutz, *Environ. health Perspect.*, vol. 103, pp. 103–112 (1995).

A Review of Phytoestrogens and Their Effects in Relation to Menopausal Symptoms, Knight et al., *Australian J. of Nut. And Dietetics*, 53:1, pp. 5–11 (1996).

Phytoestrogen Content of Processed Soybean Products, Murphy, *Food Technology*, pp. 60, 62–64 (Jan. 1982).

Naturally Occurring Non–Steroidal Estrogens of Dietary Origin, Setchell, *Estrogens in the Environment*, J. McLachlen, Editor, pp. 69–85.

An Extract of Soy Flour Influences Serum Cholesterol and Thyroid Hormones in Rats and Hamsters, Balmir, F. et al., *J. Nutr.*, 126: 3046–3053 (1996).

METHOD FOR INHIBITING OR REDUCING THE RISK OF MACULAR DEGENERATION

FIELD OF THE INVENTION

The present invention relates to a method for inhibiting or reducing the risk of macular degeneration, and in particular, to inhibiting or reducing the risk of macular degeneration with compositions containing phytoestrogens, including pharmaceutical compositions, food compositions, and soy protein containing compositions.

BACKGROUND OF THE INVENTION

Age-related macular degeneration is the leading cause of incurable blindness in persons over 55 years of age. Approximately one in four persons age 65 or over have signs of age-related maculopathy, and about 7% of persons age 75 or over have advanced macular degeneration with vision loss. Unfortunately, treatment for macular degeneration is limited to laserphotocoagulation, which is effective only for a small subset of those suffering the disease.

Macular degeneration is a degeneration of the macular region of the retina. The macular region of the retina is located in the center of the retina and includes the fovea, where the cone photoreceptor cells reach their greatest density. The macular region of the retina provides the greatest degree of visual acuity in the retina, and degeneration of the macula causes the loss of acute vision.

The exact causes of macular degeneration are not known, however, contributing factors have been identified. The collective result of the contributing factors is a disturbance between the photoreceptor cells and the tissues under the retina which nourish the photoreceptor cells, including the retinal pigment epithelium, which directly underlies and supports the photoreceptor cells, and the choroid, which underlies and nourishes the retinal pigment epithelium.

One factor which has been identified as contributing to macular degeneration is reactive oxidants, such as free radicals and singlet oxygen ($^1O_2$), which cause oxidative damage to the cells of the retina and the macula. The retina may be prone to oxidative damage as a result of the large degree of oxidation-susceptible polyunsaturated fatty acids present in the retina.

The macula may be particularly prone to oxidative damage since the macula is especially rich in polyunsaturated fatty acids and is exposed to a relatively high degree of high-energy blue light. Triplet oxygen, or ground state oxygen, absorbs high-energy blue light to convert to singlet oxygen, an oxidizing agent capable of damaging the polyunsaturated fatty acids, DNA, proteins, lipids, and carbohydrates in the macula. Blue light may also generate free-radical oxidizing agents by photochemical reactions with other compounds in the eye. The oxidized by-products from interactions between the retina and oxidative agents may accumulate in the retinal pigment epithelium, contributing to macular degeneration.

Another factor which may be involved in the pathology of macular degeneration is a high serum low density cholesterol lipoprotein (LDL) concentration. Low density lipoprotein cholesterol can be oxidized by an oxidizing agent to form oxidized LDL, a compound found in atherosclerotic plaques. As noted above, oxidizing agents can be generated in the macula by high energy light, and these oxidizing agents can interact with LDL to form oxidized lipid products. These products may accumulate as deposits in healthy retinal pigment epithelium and cause necrosis or death of functioning tissue. LDL cholesterol may also form atherosclerotic plaques in the blood vessels of the retinal and subretinal tissue, inducing hypoxia in the tissue, resulting in neovascularization.

Another factor which has been identified as contributing to macular degeneration, and which is an indication of advanced macular degeneration, is neovascularization of the choroid tissue underlying the photoreceptor cells in the macula. Healthy mature ocular vasculature is normally quiescent and exists in a state of homeostasis in which a balance is maintained between positive and negative mediators of angiogenisis (development of new vasculature). Macular degeneration, particularly in its advanced stages, is characterized by the pathological growth of new blood vessels in the choroid underlying the macula. Angiogenic blood vessels in the subretinal choroid often leak vision obscuring fluids, leading to blindness.

Angiogenisis in the choroid is induced by the presence of cytokine growth factors such as basic fibroblast growth factor (bFGF). Hypoxia of retinal cells is one factor which may induce the expression of such growth factors, where the hypoxia may be induced by cellular debris (drusen) accumulated in the retinal pigment epithelium, oxidative damage of retinal and subretinal tissue, or deposits of oxidized LDL cholesterol.

Existing retinal and subretinal vascular endothelial cells are activated by interaction of the cytokine growth factors, particularly bFGF, with tyrosine kinase mediated receptors of the endothelial cells. The activated endothelial cells increase in cellular proliferation and express several molecular agents, including the integrin $\alpha_v\beta_3$, adhesion molecules, and proteolytic enzymes, which enable newly developed endothelial cells to extend through the surrounding tissue. The newly extended endothelial cells form into vascular cords and eventually differentiate into mature blood vessels.

Several factors have been identified as protective factors against macular degeneration which substantially reduce the risk of developing the disease by interfering with the action of the contributing factors described above. Estrogen has been identified as a protective factor, and postmenopausal women given unopposed estrogen replacement therapy have a reduced risk of neovascular age-related macular degeneration. Evidence for Protection Against Age-Related Macular Degeneration by Carotenoids and Antioxidant Vitamins, Snodderly, *Am J Clin Nutr* 1995;62 (suppl): 1448S-61 S, 1454S. Estrogen is known to increase high density lipoprotein cholesterol (HDL) in the blood, which may produce changes in the transport and metabolism of lipid-soluble antioxidants, thus limiting the accumulation of oxidized LDL cholesterol in the retinal and subretinal tissues and blood vessels.

Certain antioxidant nutrients are also associated with a substantially reduced risk of developing macular degeneration. Protective antioxidants reduce the formation of radicals and reactive oxygen by decomposition of hydrogen peroxide without generating radicals, by quenching active singlet oxygen, and by trapping and quenching radicals before they reach a cellular target. An increased intake of the dietary antioxidants lutein and zeaxanthin, which are caroteinoids found in spinach, has been found to be protective against macular degeneration. Dietary Caroteinoids, Vitamins A, C, and E, and Advanced Age-Related Macular Degeneration, Seddon et al., *JAMA,* 272(18): 1413–20 (Nov. 9, 1994). High blood levels of antioxidant vitamins C and E have also been shown to be protective against macular degeneration. Evidence for Protection Against Age-Related Macular Degeneration by Carotenoids and Antioxidant Vitamins, Snodderly, *Am J Clin Nutr* 1995;62 (suppl): 1448S-61S, 1453S.

Treatment of advanced macular degeneration with integrin antagonists to inhibit angiogenisis in the subretinal tissues has also been proposed. Involvement of Integrins $\alpha_v\beta_3$ and $\alpha_v\beta_5$ in Ocular Neovascular Diseases, Friedlander et al., *Proc. Natl Acad. Sci. USA* 93:9764–69 (Sept. 1996). Integrin $\alpha_v\beta_3$ is necessary for angiogenisis in retinal tissue, and is only found in actively proliferating vascular endothelial cells. Peptide antagonists of $\alpha_v\Theta_3$ have been shown to substantially inhibit development of new retinal vasculature in mice.

SUMMARY OF THE INVENTION

In one aspect, the present invention is a method of inhibiting or reducing the risk of macular degeneration by administering to a human a composition containing at least one phytoestrogen in an amount effective to elevate the level of the phytoestrogen(s) in the blood, where an elevated level of the phytoestrogen(s) in the human is indicated by a blood concentration of at least 50 ng/ml of a combination of the phytoestrogen(s) and metabolites of the phytoestrogen(s). The phytoestrogens in the composition are selected from the group consisting of genistein, genistin, 6"-O-Mal genistin, 6"-O-Ac genistin, daidzein, daidzin, 6"-O-Mal daidzin, 6"-O-Ac daidzin, glycitein, glycitin, 6"-O-Mal glycitin, biochanin A, formononetin, or a mixture thereof.

In a preferred embodiment, at least one of the phytoestrogens in the composition is an antioxidant. In another preferred embodiment, at least one of the phytoestrogens in the composition is a tyrosine kinase inhibitor. In another preferred embodiment, at least one of the phytoestrogens in the composition is an angiogenisis inhibitor. In still another preferred embodiment, at least one of the phytoestrogens in the composition is effective to lower serum LDL cholesterol concentration in the human. In still another preferred embodiment, at least one of the phytoestrogens in the composition has estrogenic activity. In yet another preferred embodiment, at least one of the phytoestrogens in the composition is a vasodilitory agent.

In another aspect, the present invention is a method of inhibiting or reducing the risk of macular degeneration by administering to a human a soy protein material containing at least one phytoestrogen in an amount effective to elevate the level of the phytoestrogen(s) in the human, where an elevated level of phytoestrogen(s) in the human is indicated by a blood concentration of at least 50 ng/ml of a combination of the phytoestrogen(s) and metabolites of the phytoestrogen(s).

In a preferred embodiment, at least one of the phytoestrogens in the soy protein material is an antioxidant. In another preferred embodiment, at least one of the phytoestrogens in the soy protein material is a tyrosine kinase inhibitor. In another preferred embodiment, at least one of the phytoestrogens in the soy protein material is an angiogenisis inhibitor. In still another preferred embodiment, at least one of the phytoestrogens in the soy protein material is effective to lower serum LDL cholesterol concentration in the human. In still another preferred embodiment, at least one of the phytoestrogens in the soy protein material has estrogenic activity. In yet another preferred embodiment, at least one of the phytoestrogens in the soy protein material is a vasodilitory agent. In yet another preferred embodiment, the soy protein in the soy protein material has an amino acid profile effective to induce vasodilation upon ingestion.

DESCRIPTION OF THE PREFERRED EMBODIMENTS

As used herein, the term "inhibit" is used in accordance with its generally accepted meaning and includes prohibiting, slowing, stopping, restraining, or reversing the progression, development, severity, or symptom of macular degeneration. The term "macular degeneration" refers to a degeneration of the macular region of the retina, the symptoms of which include large or confluent drusen and retinal pigmentary changes, and includes early stages of degeneration of the macula in which vision has not been significantly affected ("dry" macular degeneration), atrophic macular degeneration, and exudative disease in which neovascularization is prevelant ("wet" macular degeneration). The term "angiogenesis" refers to the development of new vasculature in the retinal and subretinal tissues, including the retinal pigment epithelium and the choroid. The term "tyrosine kinase inhibitor" refers to an agent which inhibits the tyrosine kinase mediated expression of a protein or activation of a cell by interfering with the tyrosine kinase activity which enables expression of the protein or activation of the cell. The term "vasodilation" refers to dilation of a blood vessel, typically in response to an agent effective to cause the endothelial cells or the smooth muscle cells of the blood vessel to relax. As used herein "Mal" represents "malonyl" and "Ac" represents "acetyl".

The present invention resides in the discovery that a select group of phytoestrogens—genistein, genistin, 6"-O-Mal genistin, 6"-O-Ac genistin, daidzein, daidzin, 6"-O-Mal daidzin, 6"-O-Ac daidzin, glycitein, glycitin, 6"-O-Mal glycitin, biochanin A, and formononetin, shown in Formulas 1 and 2 below—are effective in inhibiting or reducing the risk of development of macular degeneration.

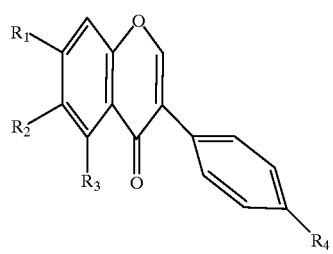

Formula 1

| Compound | $R_1$ | $R_2$ | $R_3$ | $R_4$ |
|---|---|---|---|---|
| Genistein | OH | H | OH | OH |
| Daidzein | OH | H | H | OH |
| Glycitein | OH | OCH$_3$ | H | OH |
| Biochanin A | OH | H | OH | OCH$_3$ |
| Formononetin | OH | H | H | OCH$_3$ |

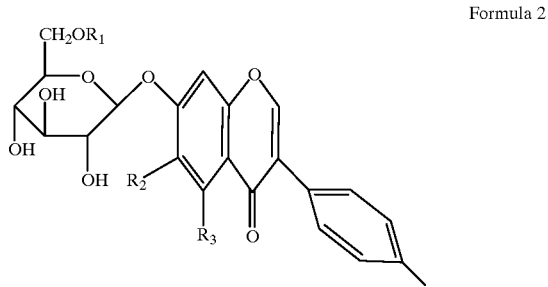

Formula 2

| Compound | R₁ | R₂ | R₃ | R₄ |
|---|---|---|---|---|
| Genistin | H | H | OH | OH |
| 6'-OMal genistin | COCH₂CO₂H | H | OH | OH |
| 6'-OAc genistin | COCH₃ | H | OH | OH |
| Daidzin | H | H | H | OH |
| 6'-OMal daidzin | COCH₂CO₂H | H | H | OH |
| 6'-OAc daidzin | COCH₃ | H | H | OH |
| Glycitin | H | OCH₃ | H | OH |
| 6'-OMal glycitin | COCH₃ | OCH₃ | H | OH |

The phytoestrogens of Formulas 1 and 2 exhibit estrogenic activity, a protective factor against macular degeneration. The estrogenic activity of the phytoestrogens is effective to lower serum LDL cholesterol levels in the blood. The reduction of LDL cholesterol levels in the blood reduces the amount of LDL cholesterol available for oxidation in the macula, thereby reducing the accumulation of oxidized lipid products in the retinal pigment epithelium. The reduction of LDL cholesterol levels in the blood also reduces atherosclerotic plaque buildup in the retinal and subretinal blood vessels, reducing hypoxia in retinal and subretinal tissues, and ultimately inhibiting the growth of new blood vessels.

Advantageously, specific phytoestrogens in the group have further protective functionality against macular degeneration. Some, such as genistein and daidzein, are effective antioxidants. The antioxidant activity of these phytoestrogens is effective to reduce the amounts of reactive oxidized species in the macula, thereby inhibiting the damage that reactive oxidized species cause to the retinal and subretinal tissues. Some, particularly genistein, are tyrosine kinase inhibitors which inhibit angiogenesis in the retinal pigment epithelium and the choroid. The tyrosine kinase inhibiting activity of these phytoestrogens interferes with the activation of existing endothelial cells by cytokine growth factors, particularly bFGF, thereby preventing the development of new blood vessels by activated endothelial cells. Some, including genistein and daidzein, have vasodilating activity which induces the dilation of retinal and subretinal vasculature, permitting more blood flow through the vessels and reducing the incidence of hypoxia. Other phytoestrogens of Formulas 1 and 2 are metabolized in humans to phytoestrogens having antioxidant activity, tyrosine kinase inhibiting activity, or vasodilation activity, for example biochanin A is metabolized to genistein and formononetin is metabolized to daidzein.

To inhibit or reduce the risk of macular degeneration, a composition containing at least one phytoestrogen selected from the phytoestrogen isoflavone compounds of Formulas 1 and 2 is administered to a human, preferably daily or on some other regular basis, in an amount effective to elevate the level of the phytoestrogen(s) in the blood. An elevated level of phytoestrogen(s) in the blood is indicated by a blood concentration of a combination of the phytoestrogen(s) and its/their metabolites of at least 50 ng/ml, and more preferably a blood concentration of at least 50 ng/ml of the phytoestrogen(s) itself/themselves. Primary metabolites of the phytoestrogens of Formulas 1 and 2 in humans are equol, angolensin, O-desmethylangolensin, dihydrodaidzein, dehydroequol, 2-dehydro-O-desmethylangolensin, tetrahydrodaidzein, dihydrogenistein, and 6''-hydroxy-O-desmethylangolensin. Preferably the composition containing the phytoestrogen(s) is a pharmaceutical composition or a dietary composition.

A pharmaceutical composition in accordance with the method of the present invention is a composition containing at least one of the phytoestrogens of Formulas 1 and 2 and an excipient. Pharmaceutical compositions incorporating the phytoestrogen compounds of Formulas 1 and/or 2 can be prepared by procedures known in the art. For example, the phytoestrogen compounds can be formulated into tablets, capsules, powders, suspensions, solutions for parenteral administration including intravenous, intramuscular, and subcutaneous administration, and into solutions for application onto patches for transdermal application with common and conventional carriers, binders, diluents, and excipients. In a preferred embodiment, a pharmaceutical formulation for use in the methods of the present invention includes a phytoestrogenic material containing at least 40% genistein, at least 15% daidzein, and at least 1% glycitein. In another preferred embodiment, a pharmaceutical formulation includes a phytoestrogenic material containing at least 85% genistein, at least 5% daidzein, and at least 0.5% glycitein.

Inert pharmaceutically acceptable carriers useful to form pharmaceutical formulations in accordance with the present invention include starch, mannitol, calcium sulfate, dicalcium phosphate, magnesium stearate, silicic derivatives, and/or sugars such as sucrose, lactose, and glucose. Binding agents include carboxymethyl cellulose and other cellulose derivatives, gelatin, natural and synthetic gums including alginates such as sodium alginate, polyethylene glycol, waxes and the like. Diluents useful in the invention include a suitable oil, saline, sugar solutions such as aqueous dextrose or aqueous glucose, and glycols such as polyethylene or polypropylene glycol. Other excipients include lubricants such as sodium oleate, sodium acetate, sodium stearate, sodium chloride, sodium benzoate, talc, and magnesium stearate, and the like; disintegrating agents including agar, calcium carbonate, sodium bicarbonate, starch, xanthan gum, and the like; and adsorptive carriers such as bentonite and kaolin. Coloring and flavoring agents may also be added to the pharmaceutical formulations.

A dietary composition in accordance with the method of the present invention is a food ingredient or a food to containing at least one of the phytoestrogenic compounds of Formulas 1 and/or 2. Dietary compositions incorporating the phytoestrogenic compounds of Formulas 1 and/or 2 can be prepared by adding the phytoestrogenic compounds to a food or a food ingredient in the process of preparing a food, independent of the source from which the phytoestrogen compounds are derived. The foods to which the phytoestrogen compounds may be added include almost all foods. For example, the phytoestrogen compounds can be added to foods including, but not limited to, meats such as ground meats, emulsified meats, marinated meats, and meats injected with the phytoestrogen compounds; beverages such as nutritional beverages, sports beverages, protein fortified beverages, juices, milk, milk alternatives, and weight loss beverages; cheeses such as hard and soft cheeses, cream cheese, and cottage cheese; frozen desserts such as ice cream, ice milk, low fat frozen desserts, and non-dairy frozen desserts; yogurts; soups; puddings; bakery products;

salad dressings; dips and spreads such as mayonnaise and chip dips; and extruded snack products. The phytoestrogen compounds are added to the food in an amount selected to deliver a desired dose of the compounds to the consumer of the food. In a preferred embodiment, a phytoestrogen compound added to a food for use as a dietary composition in accordance with the methods of the present invention contains at least 40% genistein, at least 15% daidzein, and at least 1% glycitein. In another preferred embodiment, a phytoestrogen compound added to a food contains at least 85% genistein, at least 5% daidzein, and at least 0.5% glycitein.

To inhibit or reduce the risk of macular degeneration, one or more of the phytoestrogenic compounds of Formulas 1 and/or 2 is adminstered on an ongoing regular basis, preferably daily, to a human. The phytoestrogen compound is administered as a pharmaceutical composition or as a dietary composition, depending on which route of administration is more effective and/or acceptable. A pharmaceutical composition or a dietary composition may be formed as described above.

The particular dosage of a prophylactically administered phytoestrogenic composition in accordance with the present invention will depend on the route of administration, and on the desired blood concentration of the phytoestrogenic compound(s). The dosage of the prophylactically administered phytoestrogenic composition should be effective to raise the concentration of the phytoestrogens and their metabolites in the blood to a level effective to inhibit or reduce the risk of macular degeneration by reducing the serum LDL cholesterol concentration, by providing agents having estrogenic activity, by providing protective antioxidants, by providing tyrosine kinase inhibitors, and/or by increasing vasodilation in the retinal and subretinal vasculature. The blood concentration of the phytoestrogen compound(s) and/or its metabolites should be at least 50 ng/ml (nanograms per milliliter), more preferably from about 50 ng/ml to about 10,000 ng/ml, and most preferably from about 500 ng/ml to about 5000 ng/ml to provide the desired inhibition or reduction of risk of macular degeneration. A generally acceptable safe and effective dose of the phytoestrogenic compounds for obtaining the desired blood concentration of the phytoestrogen(s) and metabolites to inhibit or reduce the risk of macular degeneration is from about 0.1 mg/day to about 1000 mg/day, more typically from about 20 mg/day to about 750 mg/day, where a dose is defined as the amount of the phytoestrogenic compounds administered per day.

The phytoestrogenic isoflavone compounds of Formulas 1 and 2 are naturally occurring substances which may be found in plants such as legumes, clover, and the root of the kudzu vine (pueraria root). Common legume sources of these phytoestrogenic isoflavone compounds include soy beans, chick peas, and various other types of beans and peas. Clover sources of these phytoestrogenic isoflavone compounds include red clover and subterranean clover. Soy beans are a particularly preferred source of the phytoestrogenic isoflavone compounds (except biochanin A which is not present in soy).

The phytoestrogenic isoflavone compounds of Formulas 1 and 2 may be isolated from the plant sources in which they naturally occur, and several of the phytoestrogenic isoflavone compounds of Formulas 1 and 2 may be synthetically prepared by processes known in the art. For example, daidzein may be isolated from red clover as disclosed by Wong (*J. Sci. Food Agr., Vol.* 13, p. 304 (1962)) or may be isolated from the mold *Micromonospora halophytica* as provided by Ganguly and Sarre (*Chem. & Ind* (London), p. 201 (1970)), both references of which are incorporated by reference herein. Daidzein may be synthetically prepared by the methods provided by Baker et al (*J. Chem. Soc.*, p. 274 (1933)), Wesley et al. (*Ber.* Vol. 66, p. 685 (1933)), Mahal et al. (*J. Chem. Soc.*, p. 1769 (1934)), Baker et al. (*J. Chem. Soc.*, p. 1852 (1953)), or Farkas (*Ber.* Vol. 90, p. 2940 (1957)), each reference of which is incorporated herein by reference. Daidzin may be synthetically prepared by the method of Farkas et al. (*Ber.*, Vol. 92, p. 819 (1959)), incorporated herein by reference. The daidzein isoflavone conjugates 6'-OMal daidzin and 6'-OAc daidzin can be prepared by a conventional saponification of daidzin with a malonyl or an acetyl anhydride, respectively.

Genistein may be synthetically prepared by the methods provided by Baker et al (*J. Chem. Soc.*, p. 3115 (1928)); Narasimhachari et al. (*J. Sci. Ind. Res.*, Vol. 12, p. 287 (1953)); Yoder et al., (*Proc. Iowa Acad. Sci.*, Vol. 61, p. 271 (1954); and Zemplen et al. (*Acta. Chim. Acad. Sci. Hung.*, Vol. 19, p. 277 (1959)), each reference of which is incorporated herein by reference. Genistin may be synthetically prepared by the method of Zemplen et al. (*Ber.*, Vol 76B, p. 1110 (1943)), incorporated herein by reference. The isoflavone conjugates of genistin, 6'-OMal genistin and 6'-OAc genistin, can be prepared by a conventional saponification of genistin with a malonyl or an acetyl anhydride, respectively.

Biochanin A can be synthetically prepared by the method provided by Baker et al. (*Nature* 169:706 (1952)), incorporated herein by reference. Biochanin A can also be separated from red clover by the method provided by Pope et al. (*Chem. & Ind.* (London) p. 1092 (1953)), incorporated herein by reference. Fornononetin can be synthetically prepared by the methods disclosed by Wessely et al. (*Ber.* 66:685 (1933)) and Kagel et al. (*Tetrahedron Letters*, p. 593 (1962)), both references of which are incorporated herein by reference. Fornononetin can be isolated from soybean meal by the method of Walz (*Ann.* 489:118 (1931)) or can be isolated from clover species by the method of Bradbury et al. (*J. Chem. Soc.* p. 3447 (1951)), both references of which are incorporated herein by reference.

A preferred method of isolating the phytoestrogenic isoflavone compounds of Formulas 1 and 2 from plant materials in which they naturally occur is to extract the plant materials with an alcohol, preferably methanol or ethanol, or an aqueous solution, preferably an aqueous alkaline solution, to remove the isoflavones from the plant material. It is preferred to comminute the plant material before extracting the phytoestrogenic isoflavone compounds to maximize recovery of the isoflavone compounds from the plant material. The phytoestrogenic isoflavone compounds can be isolated from the extract by conventional separation procedures such as reverse phase high performance liquid chromatography ("HPLC").

In a preferred embodiment, the phytoestrogenic isoflavone compounds genistein, genistin, 6'-OMal genistin, 6'-OAc genistin, daidzein, daidzin, 6'-OMal daidzin, 6'-OAc daidzin, glycitein, glycitin, and 6'-OMal glycitin are isolated from a soy material, preferably a commercially available soy material. Soy materials from which the phytoestrogenic isoflavone compounds can be isolated include: soy beans, dehulled soy beans, soy meal, soy flour, soy grits, soy flakes (full fat and defatted), soy cotyldeons, soy molasses, soy protein concentrate, soy whey, soy whey protein, and soy protein isolate. In one embodiment, the phytoestrogenic isoflavones are extracted from soy beans, dehulled soy beans, soy meal, soy flour, soy grits, soy flakes, soy protein concentrate, soy whey protein, or soy protein isolate, preferably soy meal, soy flour, soy grits, or soy flakes, with a low molecular weight organic extractant, preferably an alcohol, ethyl acetate, acetone, or ether, and most preferably aqueous ethyl alcohol or methyl alcohol. Most preferably the extractant has a pH of about the isoelectric point of soy protein (about pH 4 to pH 5) to minimize the amount of soy protein extracted by the extractant.

The extractant containing the phytoestrogenic isoflavones is separated from the insoluble soy materials to form a phytoestrogenic isoflavone enriched extract. If desired, a phytoestrogenic isoflavone enriched material may be recovered by concentrating the extract to remove the solvent thereby producing a solid phytoestrogenic isoflavone enriched material.

In a more preferred embodiment the phytoestrogenic isoflavone compounds are further purified from other soy materials soluble in the extract by contacting the extract with a material which adsorbs the phytoestrogenic isoflavones in the extract, and eluting the adsorbed phytoestrogenic isoflavones out of the adsorbent material with a solvent which causes the isoflavones to be differentially eluted from the adsorbent material.

In a preferred embodiment, the phytoestrogenic isoflavones are separated from impurities in the extract by a conventional reverse phase HPLC separation. After extraction of the isoflavones from the soy material and separation of the extract from the insoluble soy materials, the extract is filtered to remove insoluble materials that could plug an HPLC column. An HPLC column is prepared by packing a conventional commercially available HPLC column with a particulate adsorbent material which will releasably bind the isoflavones and impurities in the extract in a compound specific manner. The adsorbent material may be any reverse phase HPLC packing material, however, a preferred packing material may be chosen by the criteria of load capacity, separation effectiveness, and cost. One such preferred packing material is Kromasil C18 16 μm 100 Å beads available from Eka Nobel, Nobel Industries, Sweden.

The filtered extract is passed through the packed HPLC column until all the binding sites of the column are fully saturated with isoflavones, which is detected by the appearance of isoflavones in the effluent from the column. The HPLC column may then be eluted with a solvent to effect the separation. In a preferred embodiment, the eluent is a polar solvent such as ethanol, methanol, ethyl acetate, or acetonitrile, and preferably is an aqueous alcohol having an alcohol content of between about 30% and about 90%, most preferably about 50%, and most preferably the alcohol is ethanol.

The phytoestrogenic isoflavone compounds and impurities are separately collected from the column effluent. The isoflavone fractions of the eluent may be identified from other eluent fractions in accordance with conventional HPLC and analytical chemistry techniques. In a preferred embodiment the eluent fractions containing the phytoestrogenic aglucone isoflavones are collected separately since the aglucone isoflavones are believed to be particularly active tyrosine kinase inhibitors which inhibit angiogenesis in the retinal pigment epithelium and choroid and correspondingly inhibit the development of macular degeneration. Of the aglucone isoflavone materials, the fraction of effluent containing daidzein elutes from the column first, followed by a glycitein fraction, followed by the more polar genistein.

The phytoestrogenic isoflavone fractions of the eluent may be collected from the column, and the volatile content of the solvent (e.g. alcohol) can be removed by evaporation. The phytoestrogenic isoflavone compounds can be recovered directly if the all of the solvent is removed by evaporation, or may be recovered by chilling the remaining solvent (e.g. water) and centrifuging or filtering the remaining solvent.

In a particularly preferred embodiment the soy phytoestrogenic isoflavone conjugates—6'-OMal genistin, 6'-OAc genistin, 6'-OMal daidzin, 6'-OAc daidzin, and 6'-OMal glycitin—and the soy phytoestrogenic isoflavone glucosides—genistin, daidzin, and glycitin—are converted to their respective phytoestrogenic aglucone isoflavone forms—genistein, daidzein, and glycitein. The conversion of the isoflavone conjugates and isoflavone glucosides to the aglucone isoflavones can be effected in the soy substrate from which the phytoestrogenic isoflavones are to be extracted prior to the extraction, or may be effected in the isoflavone enriched extract after separation of the extract from the insoluble soy materials. As noted above, the aglucone isoflavone compounds are believed to be particularly active in inhibiting angiogenesis and macular degeneration, and the aglucone isoflavones are more easily separated from an extract containing water than their respective conjugate and glucoside forms since the aglucones are less water soluble.

The isoflavone conjugates 6"-O-Mal genistin, 6"-O-Ac genistin, 6"-O-Mal daidzin, 6"-O-Ac daidzin, and 6"-O-Mal glycitin can be converted to their respective glucosides genistin, daidzin, and glycitin by forming an aqueous alkaline solution of the soy substrate containing the isoflavones having a pH of about 6 to about 13, preferably about pH 9 to about pH 11, and treating the aqueous alkaline solution at a temperature of about 2° C. to about 121° C., preferably about 25° C. to about 75° C., for a period of time sufficient to effect the conversion, preferably about 30 minutes to about 5 hours, more preferably about 30 minutes to about 1.5 hours. The isoflavone glucosides genistin, daidzin, and glycitin can be converted to their respective aglucone forms genistein, daidzein, and glycitein by contacting the isoflavone glucosides with an enzyme capable of cleaving a 1,4-β-glucoside bond—preferably a commercially available beta-glucosidase enzyme, an alpha- or beta-galactosidase enzyme, a pectinase enzyme, a lactase enzyme, or a glucoamylase enzyme—at a pH at which the enzyme is active, typically from about pH 3 to about pH 9, and at a temperature of about 25° C. to about 75° C., more preferably about 45° C. to about 65° C., for a period of time sufficient to effect the conversion, typically about 1 hour to about 24 hours, preferably about 1 hour to about 3 hours.

The phytoestrogenic aglucone isoflavones can be separated from the soy substrate using conventional separation procedures. For example, the aglucone isoflavones may be extracted from the soy substrate with a low molecular weight alcohol. The aglucone isoflavones may be separated from the extract by conventional recrystallization processes, or by HPLC. In a particularly preferred embodiment, a phytoestrogenic isoflavone composition isolated from a soy substrate for formulation into a pharmaceutical composition or a dietary composition for use in the method of the present invention includes at least 40% genistein, at least 15% daidzein, and at least 1% glycitein. In another particularly preferred embodiment of the invention, a phytoestrogenic isoflavone composition isolated from a soy substrate for formulation into a pharmaceutical composition or a dietary composition for use in the method of the present invention contains at least 85% genistein, at least 5% daidzein, and at least 0.5% glycitein.

Several of the phytoestrogenic isoflavone compounds of Formula 1 and Formula 2 are commercially available, and may be purchased for formulation into pharmaceutical compositions or dietary compositions useful in the method of the present invention. For example, genistein, daidzein, and glycitein are commercially available and may be purchased, for example, from Indofine Chemical Company Inc., P.O. Box 473, Somerville, N.J. 08876, and biochanin A is available from Aldrich Chemical Company, Inc., 940 West Saint Paul Avenue, Milwaukee, Wis. 53233.

In another aspect of the invention, a soy protein material containing at least one of the phytoestrogenic compounds of Formulas 1 and/or 2 is administered to a human, preferably on a regular basis, most preferably daily, in an amount effective to elevate the level of the phytoestrogen(s) in the human to inhibit or reduce the risk of macular degeneration. An elevated level of phytoestrogens in the human is indicated by a blood concentration of at least 50 ng/ml of a combination of the phytoestrogens and their metabolites, and more preferably a blood concentration of at least 50 ng/ml of the phytoestrogens themselves. As noted above, the primary metabolites of the phytoestrogens of Formulas 1 and 2 are equol, anglolensin, O-desmethylangolensin, dihydrodaidzein, dehydroequol, 2-dehydro-O-desmethylangolensin, tetrahydrodaidzein, dihydrogenistein, and 6"-hydroxy-O-desmethylangolensin.

Soy protein materials, as indicated above, contain significant amounts of the phytoestrogens of Formulas 1 and 2, except biochanin A and formononetin, which are not present or are present in insignificant amounts in soy protein. The phytoestrogen components of a soy protein material provide several protective factors against macular degeneration, as described above.

Soy protein provides an additional protective factor against macular degeneration resulting from the high arginine amino acid content of soy protein. L-arginine amino acid is the substrate from which nitric oxide is synthesized in the body by the enzyme nitric oxide synthase. Nitric oxide is a powerful vasodilator and has antiplatelet and other properties that inhibit atherogenesis. Soy protein, as a function of its high arginine content, therefore, provides enhanced anti-atherogenesis and vasodilation activities to the vascular system. Inhibition of atherogenesis in the vasculature of the retinal pigment epithelium and the choroid prevents the development of atherosclerotic plaques which deprive macular tissues of nutrients and induce hypoxia. As noted above, vasodilation of the vasculature of the retinal pigment epithelium and choroid permits more blood flow through the vessels and reduces the incidence of hypoxia in the macular tissues.

A soy protein material for use in accordance with the method of the present invention is a whole soybean seed, or soy protein derivatives that can be formed from whole soybeans. Soy protein derivatives of whole soybeans include fat-containing or defatted: soy protein isolates, soy protein concentrates, soy flours, and soy meals which are formed in accordance with conventional methods for forming such materials. Soy protein derivatives of whole soybeans also include peptide materials which are formed by hydrolyzing soy protein containing materials in accordance with conventional methods for hydrolyzing soy protein materials, such as enzymatic or acid hydrolysis.

In a particularly preferred embodiment, the soy protein material used in the method of the invention is a soy protein isolate. To form the phytoestrogen containing soy protein isolate, a commercially available defatted soy flake material is extracted with an aqueous alkaline solution, typically a calcium hydroxide or a sodium hydroxide solution having a pH of about 6 to about 10, to form an extract containing phytoestrogenic isoflavones, protein, and other water soluble components of the soy flake material. The extract is separated from insoluble soy materials and then is treated with an acid to lower the pH of the extract to about the isoelectric point of the protein, preferably to a pH of about 4 to about 5, and most preferably to a pH of about 4.4 to about 4.6, thereby precipitating a protein curd which captures significant amounts of the phytoestrogenic isoflavones as a result of hydrogen bonding between the protein and the isoflavones. Preferably the conjugate and glucoside phytoestrogenic isoflavones are converted to aglucone isoflavones in the extract as described above to increase the amount of aglucone isoflavones captured in the protein curd. The protein curd is then separated from the extract, preferably by centrifugation, and dried to form the protein isolate.

In another preferred embodiment, the soy protein material used in the method of the invention is a soy protein concentrate. To form the phytoestrogen containing soy protein concentrate, a commercially available defatted soy flake material is washed with an alcohol, preferably an aqueous alcohol such as 80% ethanol or 80% methanol, or an aqueous solution having a pH equivalent to the isoelectic point of soy protein, about pH 4.4 to about 4.6. The wash is separated from the protein material, leaving the soy protein concentrate. Preferably the conjugate and glucoside phytoestrogenic isoflavones are converted to aglucone isoflavones as described above to increase the amount of aglucone isoflavones in the protein concentrate.

The soy protein material may be incorporated into a food or a beverage to increase the acceptability of administration of the soy protein material. For example, a soy protein isolate or soy protein concentrate may be incorporated as an ingredient in a wide variety of foods and beverages such as meats, meat analogs, protein fortified beverages, soups, juices, cheeses, yogurts, puddings, salad dressings, ice creams, milks, and extruded snack products. Soy protein peptides are particularly suited for use in acidic beverages such as sports beverages and nutritional beverages. If desired, the soy protein can be formulated into a tablet, pill, or capsule using conventional binders and excipients for oral administration.

To inhibit or reduce the risk of macular degeneration, the soy protein material is adminstered on an ongoing regular basis, preferably daily, to a human. The amount of soy protein material administered should be sufficient to elevate the blood concentration of the phytoestogen isoflavone compounds and/or their metabolites to at least 50 ng/ml (nanograms per milliliter), more preferably from about 50 ng/ml to about 10,000 ng/ml, and most preferably from about 500 ng/ml to about 5000 ng/ml to provide the desired inhibition or reduction of risk of macular degeneration. Preferably sufficient soy protein material should be administered to provide from about 0.1 mg/day to about 1000 mg/day of the phytoestrogen isoflavone compounds to the human, and more preferably from about 20 mg/day to about 750 mg/day of the phytoestrogen isoflavone compounds. Further, at least about 5 grams to about 500 grams of the soy protein material should be administered per day to the human to provide the benefit of the arginine rich soy protein to inhibit or reduce the risk of macular degeneration, and more preferably from about 15 grams to about 300 grams of the soy protein material should be administered per day.

The following non-limiting formulations illustrate pharmaceutical and dietary formulations including the phytoestrogenic compounds of Formulas 1 and 2 which may be used in accordance with the methods of the present invention

FORMULATIONS

The following Formulations 1–4 illustrate pharmaceutical formulations including a phytoestrogen compound of Formula 1 and/or Formula 2. In the formulations, "Active ingredient" means a compound or a mixture of compounds of Formulas 1 and/or 2.

Formulation 1

Gelatin capsules

Hard gelatin capsules are prepared using the following ingredients: Active ingredient 0.1–1000 mg/capsule; Starch, NF 0–600 mg/capsule; Starch flowable powder 0–600 mg/capsule; Silicone fluid 350 centistokes 0–20 mg/capsule. The ingredients are mixed, passed through a sieve, and filled into capsules.

Formulation 2

Tablets

Tablets are prepared using the following ingredients: Active ingredient 0.1–1000 mg/tablet; Microcrystalline cellulose 20–300 mg/tablet; Starch 0–50 mg/tablet; Magnesium stearate or stearate acid 0–15 mg/tablet; Silicon dioxide, fumed 0–400 mg/tablet; silicon dioxide, colloidal 0–1 mg/tablet, and lactose 0–100 mg/tablet. The ingredients are blended and compressed to form tablets.

Formulation 3

Suspensions

Suspensions are prepared using the following ingredients: Active ingredient 0.1–1000 mg/5ml; Sodium carboxymethyl cellulose 50–700 mg/5ml; Sodium benzoate 0–10 mg/5ml; Purified water 5 ml; and flavor and color agents as needed.

Formulation 4

Parenteral solutions

A parenteral composition is prepared by stirring 1.5% by weight of active ingredient in 10% by volume propylene glycol and water. The solution is made isotonic with sodium chloride and sterilized.

The following Formulations 5–8 illustrate dietary supplements that may be formed using a soy protein isolate rich in several of the phytoestrogen isoflavone compounds of Formula 1 and/or Formula 2. The phytoestrogen isoflavone rich soy protein isolate in the following examples typically contains between about 1 to about 3 milligrams of the phytoestrogen isoflavone compounds per gram of soy protein.

Formulation 5

Ready to drink beverage
A ready to drink beverage is formed of the following components:

| Ingredient | Percent of composition, by weight |
| --- | --- |
| Water | 80–85 |
| Isoflavone rich soy protein isolate | 10–15 |
| Sucrose | 5–8 |
| Cocoa | 0.1–1 |
| Vitamins/Minerals | 0.1–1 |
| Flavor | 0.1–1 |
| Cellulose gel | 0.1–0.5 |

The ready to drink beverage may be served in 8 ounce servings containing about 20 grams of isolated soy protein including about 20 to about 60 milligrams of the phytoestrogen isoflavone compounds.

Formulation 6

Powdered beverage
A powdered beverage is formed of the following components:

| Ingredient | Percent of composition, by weight |
| --- | --- |
| Isoflavone rich soy protein isolate | 85–90 |
| Sucrose | 8–15 |
| Maltodextrin | 1–5 |
| Vitamins/Minerals | 0.5–2 |
| Aspartame | 0–0.5 |
| Flavor | 0–0.5 |

30 grams of the powdered beverage formulation may be added to water to form a serving containing about 20 grams of soy protein isolate including about 20 to about 60 milligrams of the phytoestrogen isoflavone compounds.

Formulation 7

Food bar
A food bar is formed of the following components:

| Ingredients | Percent of composition, by weight |
| --- | --- |
| Isoflavone rich soy protein isolate | 20–30 |
| Corn syrup | 35–45 |
| Rice syrup solids | 7–14 |
| Glycerin | 1–5 |
| Cocoa | 2–7 |
| Compound coating | 15–25 |

The food bar may be served in 70 gram portions containing about 15 grams of soy protein isolate having about 15 to about 45 milligrams of the phytoestrogen isoflavone compounds therein.

Formulation 8

Soy yogurt
A soy yogurt is formed of the following components:

Formulation 8

Soy yogurt
A soy yogurt is formed of the following components:

| Ingredients | Percent of composition, by weight |
| --- | --- |
| Water | 65–75 |
| Isoflavone rich soy protein isolate | 5–15 |
| Sucrose | 3–8 |
| Corn starch | 1–5 |
| Dextrin | 0.3–1 |
| Cellulose gel | 1–3 |
| Culture (yogurt) | 0.01–0.1 |
| Fruit | 10–20 |
| Vitamins/Minerals | 0.05–0.3 |

The soy yogurt may be served in a 170 gram serving containing about 8 grams of soy protein isolate having about 8 to about 24 milligrams of phytoestrogen isoflavone compounds therein.

The above description is intended to be illustrative of the present invention, and is not intended to be limiting. Other embodiments are within the claims.

What is claimed is:

1. A method of inhibiting or reducing the risk of macular degeneration, comprising:
   administering to a human in need thereof a composition containing at least one phytoestrogen selected from the group consisting of genistein, genistin, 6"-O-Mal genistin, 6"-O-Ac genistin, daidzein, daidzin, 6"-O-Mal daidzin, 6"-O-Ac daidzin, glycitein, glycitin, 6"-O-Mal glycitin, biochanin A, formononetin, or a mixture thereof, in an amount effective to elevate the level of said phytoestrogen in said human, where an elevated level of said phytoestrogen in said human is indicated by a blood concentration of at least 50 ng/ml of said phytoestrogen and metabolites of said phytoestrogen.

2. The method of claim 1 wherein at least one of said phytoestrogens in said composition is an antioxidant.

3. The method of claim 1 wherein at least one of said phytoestrogens in said composition is a tyrosine kinase inhibitor.

4. The method of claim 1 wherein at least one of said phytoestrogens in said composition is an angiogenesis inhibitor.

5. The method of claim 1 wherein at least one of said phytoestrogens in said composition is effective to lower LDL cholesterol concentration in the blood of said human.

6. The method of claim 1 wherein at least one of said phytoestrogens in said composition has estrogenic activity.

7. The method of claim 1 wherein at least one of said phytoestrogens in said composition is a vasodilitory agent.

8. The method of claim 1 wherein at least one of said phytoestrogens in said composition is derived from soy or clover.

9. The method of claim 1 wherein said composition is a pharmaceutical composition containing an excipient and said phytoestrogen.

10. The method of claim 8 wherein said pharmaceutical composition is a pill or a capsule.

11. The method of claim 9 wherein said pharmaceutical composition is a suspension or a solution.

12. The method of claim 11 wherein said pharmaceutical composition is capable of being administered subcutaneously.

13. The method of claim 11 wherein said pharmaceutical composition is capable of being administered transdermally.

14. The method of claim 9 wherein said pharmaceutical compostion is capable of being administered orally.

15. The method of claim 1 wherein said composition is a dietary composition.

16. The method of claim 15 wherein said dietary composition contains a food ingredient and said phytoestrogen.

17. The method of claim 1 wherein said composition contains from about 0.1 mg to about 2000 mg of said phytoestrogen.

18. The method of claim 17 wherein said composition contains from about 20 mg to about 1000 mg of said phytoestrogen.

19. The method of claim 1 wherein said composition is adminstered to said human in a dosage of from about 5 mg/day to about 2000 mg/day of said phytoestrogen.

20. The method of claim 19 wherein said composition is administered to said human in a dosage of from about 30 mg/day to about 1000 mg/day of said phytoestrogen.

21. A method of inhibiting or reducing the risk of macular degeneration, comprising, administering to a human in need thereof a soy protein material containing at least one phytoestrogen selected from the group consisting of genistein, genistin, 6"-O-Mal genistin, 6"-O-Ac genistin, daidzein, daidzin, 6"-O-Mal daidzin, 6"-O-Ac daidzin, glycitein, glycitin, 6"-O-Mal glycitin, or a mixture thereof in an amount effective to elevate the level of said phytoestrogen in said human, where an elevated level of said phytoestrogen in said human is indicated by a blood concentration of at least 50 ng/ml of said phytoestrogen and metabolites of said phytoestrogen.

22. The method of claim 21 wherein at least one of said phytoestrogens in said soy protein material is an antioxidant.

23. The method of claim 21 wherein at least one of said phytoestrogens in said soy protein material is a tyrosine kinase inhibitor.

24. The method of claim 21 wherein at least one of said phytoestrogens in said soy protein material is an angiogenisis inhibitor.

25. The method of claim 21 wherein said soy protein material containing said phytoestrogen is effective to lower LDL cholesterol concentration in the blood of said human.

26. The method of claim 21 wherein at least one of said phytoestrogens in said soy protein material is effective to exhibit estrogenic activity.

27. The method of claim 21 wherein said soy protein material containing said phytoestrogen is a vasodilitory agent.

28. The method of claim 21 wherein said soy protein material is a soy protein isolate.

29. The method of claim 21 wherein said soy protein material is a soy protein concentrate.

30. The method of claim 21 wherein said soy protein material is a peptide material formed by hydrolyzing a soy protein containing material.

31. The method of claim 21 wherein said soy protein material is incorporated into a food or beverage for administration to said human.

32. The method of claim 21 wherein said soy protein material is administered to said human in an amount effective to deliver from about 0.1 mg to about 1000 mg of said phytoestrogen per day.

33. The method of claim 21 wherein from about 5 grams to about 500 grams of said soy protein material is administered to said human per day.

* * * * *